(12) United States Patent
Larice

(10) Patent No.: US 8,952,801 B2
(45) Date of Patent: Feb. 10, 2015

(54) MOTOR VEHICLE WITH SEVERAL ACTIVE OR PASSIVE SAFETY DEVICES

(71) Applicant: Audi AG, Ingolstadt (DE)

(72) Inventor: Markus Larice, Karlskron (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 13/757,229

(22) Filed: Feb. 1, 2013

(65) Prior Publication Data

US 2013/0257608 A1 Oct. 3, 2013

(30) Foreign Application Priority Data

Mar. 28, 2012 (DE) .......................... 10 2012 006 356

(51) Int. Cl.
*B60Q 1/00* (2006.01)
*B60Q 9/00* (2006.01)
*B60R 22/48* (2006.01)

(52) U.S. Cl.
CPC . *B60Q 9/00* (2013.01); *B60R 22/48* (2013.01); *B60R 2022/4816* (2013.01); *B60R 2022/4825* (2013.01)
USPC .......................................... 340/457.1; 701/45

(58) Field of Classification Search
USPC .......................................... 340/457.1; 701/45
See application file for complete search history.

(56) References Cited

U.S. PATENT DOCUMENTS

| 6,059,066 | A | 5/2000 | Lary | |
|---|---|---|---|---|
| 7,378,974 | B1 * | 5/2008 | Bassett et al. | 340/573.1 |
| 2007/0195990 | A1 | 8/2007 | Levy | |
| 2009/0132128 | A1 | 5/2009 | Marriott et al. | |
| 2009/0177357 | A1 | 7/2009 | Long et al. | |
| 2010/0114436 | A1 | 5/2010 | Bernhagen et al. | |

FOREIGN PATENT DOCUMENTS

| DE | 26 40 706 | 3/1978 |
|---|---|---|
| DE | 40 28 271 | 1/1991 |
| DE | 198 00 864 | 7/1999 |
| DE | 199 59 007 | 8/2000 |
| DE | 100 65 845 | 8/2002 |
| DE | 102 03 139 | 8/2002 |
| DE | 103 22 207 | 12/2004 |
| DE | 102004007787 | 9/2005 |
| DE | 102005053893 | 5/2007 |
| DE | 102009003431 | 8/2009 |
| DE | 102008031051 | 1/2010 |
| DE | 202010002102 | 6/2010 |
| DE | 102010014368 | 10/2010 |
| EP | 1 147 036 | 4/2005 |
| JP | 2003-081013 | 3/2003 |

* cited by examiner

*Primary Examiner* — Brent Swarthout
(74) *Attorney, Agent, or Firm* — Henry M. Feiereisen LLC

(57) ABSTRACT

A motor vehicle includes a safety device which is changeable between an idle position and an operative position, and an indicator which is rendered operational in at least one of two ways, a first way in which a first acoustic signal is triggered when the safety device departs the idle position, and a second acoustic signal, which differs from the first acoustic signal, is triggered when the safety device has assumed the operative position, a second way in which a first image is optically visualized in a display when the safety device departs the idle position, and a second image is optically visualized in the display when the safety device has assumed the operative position.

15 Claims, 2 Drawing Sheets

FIG. 2
FIG. 3
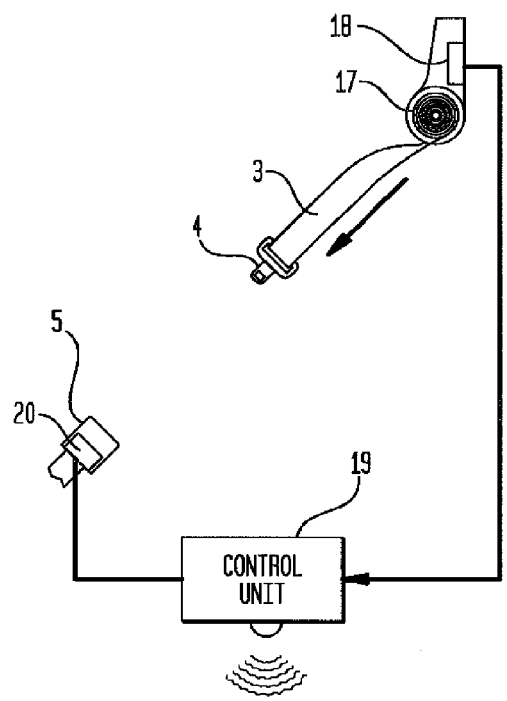
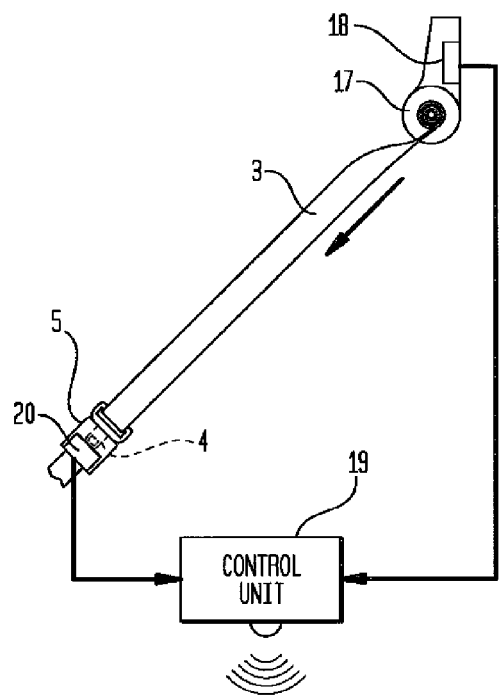

MOTOR VEHICLE WITH SEVERAL ACTIVE OR PASSIVE SAFETY DEVICES

CROSS-REFERENCES TO RELATED APPLICATIONS

This application claims the priority of German Patent Application, Serial No. 10 2012 006 356.3, filed Mar. 28, 2012, pursuant to 35 U.S.C. 119(a)-(d), the content of which is incorporated herein by reference in its entirety as if fully set forth herein.

BACKGROUND OF THE INVENTION

The present invention relates to a motor vehicle with several active or passive safety devices.

The following discussion of related art is provided to assist the reader in understanding the advantages of the invention, and is not to be construed as an admission that this related art is prior art to this invention.

Modern motor vehicles have safety devices which come in various designs and may be of active or passive nature. Examples include safety belts to restrain occupants in their seat in the event of a collision. The safety belts can have belt retractors with associated sensors to further tighten the belt in the event of a crash, using for example pyrotechnic mechanisms which are then activated. Other examples include airbags which can be installed at various locations in the motor vehicle and are deployed in the event of a crash in order to protect body parts of an occupant, or safety devices in the form of driver assist systems which process information generated by sensors that monitor the surroundings of the vehicle. Such safety devices may include collision warning systems which use radar sensors to detect the presence of an impending collision and generate respective signals or trigger an automatic reaction, or systems which monitor the surroundings behind the vehicle and generate a signal in the event the vehicle changes the lane despite approaching traffic from behind. All these systems use various sensors, including also seat occupancy sensors which detect whether a seat is occupied so as to deploy the airbag associated to this seat, when a person is seated in this seat, or a system which monitors the driver, for example typically via a camera, and processes the images to ascertain a possible driver fatigue which, when detected, causes the system to trigger a warning signal to alert the driver.

Various safety devices in particular driver assist systems can be rendered operational by the driver. This is so because not always and not every driver wishes a continuous operation of a driver assist system. Other safety devices, such as safety belts, including belt retractor, and airbags are oftentimes operational, i.e. they are activated automatically when the vehicle is started. A driver is however not in a position to recognize when a safety device, in particular an automatically activated safety device such as safety belt and airbag, is activated. In other words, the driver has to rely that the respective safety system is indeed activated automatically or in a state that ensures its function in case of need.

It would be desirable and advantageous to provide an improved motor vehicle to obviate prior art shortcomings and to enable the driver to recognize an active system state.

SUMMARY OF THE INVENTION

According to one aspect of the present invention, a motor vehicle includes a safety device changeable between an idle position and an operative position, and an indicator rendered operational to output a first signal when the safety device departs the idle position and to output a second signal, which is different than the first signal, when the safety device has assumed the operative position.

According to another aspect of the present invention, a motor vehicle includes a safety device changeable between an idle position and an operative position, and an indicator rendered operational in at least one of two ways, a first way in which a first acoustic signal is triggered when the safety device departs the idle position, and a second acoustic signal which differs from the first acoustic signal, is triggered when the safety device has assumed the operative position, a second way in which a first image is optically visualized in a display when the safety device departs the idle position, and a second image is optically visualized in the display when the safety device has assumed the operative position.

In accordance with the invention, the activation state of a system or safety device that is incorporated within the information system is advantageously indicated acoustically and/or optically or the actuation process to be executed for activation of a safety device is accompanied acoustically and/or optically, so as to provide the driver with a respective information that activation has been triggered or has, in fact, been implemented.

According to another advantageous feature of the present invention, the safety device can be constructed to be triggered automatically or actuated by a person inside the motor vehicle.

According to another advantageous feature of the present invention, the safety device may be constructed in the form of a safety belt having a buckle and being movable between the idle position in which the safety belt is retracted and the operative position in which the safety belt is locked, with the first acoustic signal or second image being triggered when the buckle is pulled away from the idle position, and the second acoustic signal or second image being triggered, when the buckle of the safety belt is engaged. The presence of the first acoustic signal during activation of the seat belt signals to the driver or passenger that s/he is in the process to render the safety device operational, i.e. the first acoustic signal accompanies the activation period, whereas the second acoustic signal alerts the driver that the activation process has been successfully completed and the safety device is activated. In the case of a safety belt, the second acoustic signal is triggered when the buckle latch has been inserted and locked in the buckle. For example, using an audio system installed in the motor vehicle, the process of pulling the safety belt from the retracted position can be accompanied by a higher tone while a locking of the buckle latch in the belt buckle triggers a more hollow and full sound, resembling the sound when a safety door or the like is closed for example. In this way, the driver is informed in a gentle manner about the activation of the safety device.

As an alternative to the acoustic information, the information may also be communicated in an optical manner, for example through imaging on a central, large-scale display or the like. For example, unwinding of a safety belt can be displayed by an image of a first color, while a locking of the safety belt can be displayed by an image of a second color.

The activation state of other types of safety devices, such as for example airbags, that are rendered operational without input by the driver may, of course, also be visualized. This can be realized for example by generating an acoustic and/or optical signal after the various systems have been initiated and a control unit has checked and confirmed their operativeness and also after the activation of these systems has concluded. Also automated activation of other safety systems and their associated sensors, such as activation of radar sensors of driver assist systems can be indicated in this way, even when these driver assist systems are not activated actively by the driver. In any case, the driver receives information about the operativeness of the sensors. The acoustic/optic information system may also be used to indicate the activation state of sensors used for example for monitoring seat occupancy, seat position, or detection of driver fatigue. The presence of several acoustic/optical signals thus provides the driver with information about the activation state and hence the operativeness of important safety systems so that the driver can move the vehicle with the knowledge and assurance of properly operating safety systems. Checking the activation and the initiation of activation is typically undertaken before moving the vehicle, i.e. when the vehicle is started and the occupants buckle up so that the information is present and provided before moving the vehicle.

The acoustic signal is advantageously generated using an audio system that has been installed in the motor vehicle and is constructed to produce distinct tones with pleasant sound quality and to vary the signals in particular in the event different states should be indicated, such as for example unwinding of seat belt and actual locking in the buckle.

Actual realization of an automatically activated state may also be indicated by a display, in particular using a symbol to optically visualize an image. It is for example possible to use a symbol to indicate the activation of an airbag and the associated sensors, and to use another symbol to indicate activation of sensors that monitor the surrounding area such as radar sensors, ultrasonic sensors, video camera, etc.

In particular in the event of an optical visualization, the activation state of different sensors can be indicated, using a common symbol to indicate for example the activation of an airbag and the entire surround sensor assembly, including the interior space sensor so that the driver can be alerted by only one symbol to indicate that the entire driver safety system is activated. Still, the presence of different symbols is, of course, also conceivable to diversify the information content. If a sensor cannot be activated, e.g. because of malfunction, an error symbol is indicated, optionally with indication of the defective sensor.

In order to be able to inform the driver during travel about the state of activation of the safety sensors and safety devices, the display of information may be provided, optionally in modified form, e.g. on a reduced scale, also during travel of the vehicle. In a simplest case, display of a green+symbol as optical activation information indicates that the safety systems are activated and work properly, and this green+symbol may be indicated in the display in large format when starting the ride and then appear continuously in the display for example at the marginal area on a significantly reduced format while of course monitoring the activation state. In any event, the driver receives continuously information about the system activation.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a schematic illustration of a seat belt during an unwinding process; and FIG. 3 is a schematic illustration of the seat belt after the buckle latch has engaged the buckle.

DETAILED DESCRIPTION OF PREFERRED EMBODIMENTS

Figure 1:
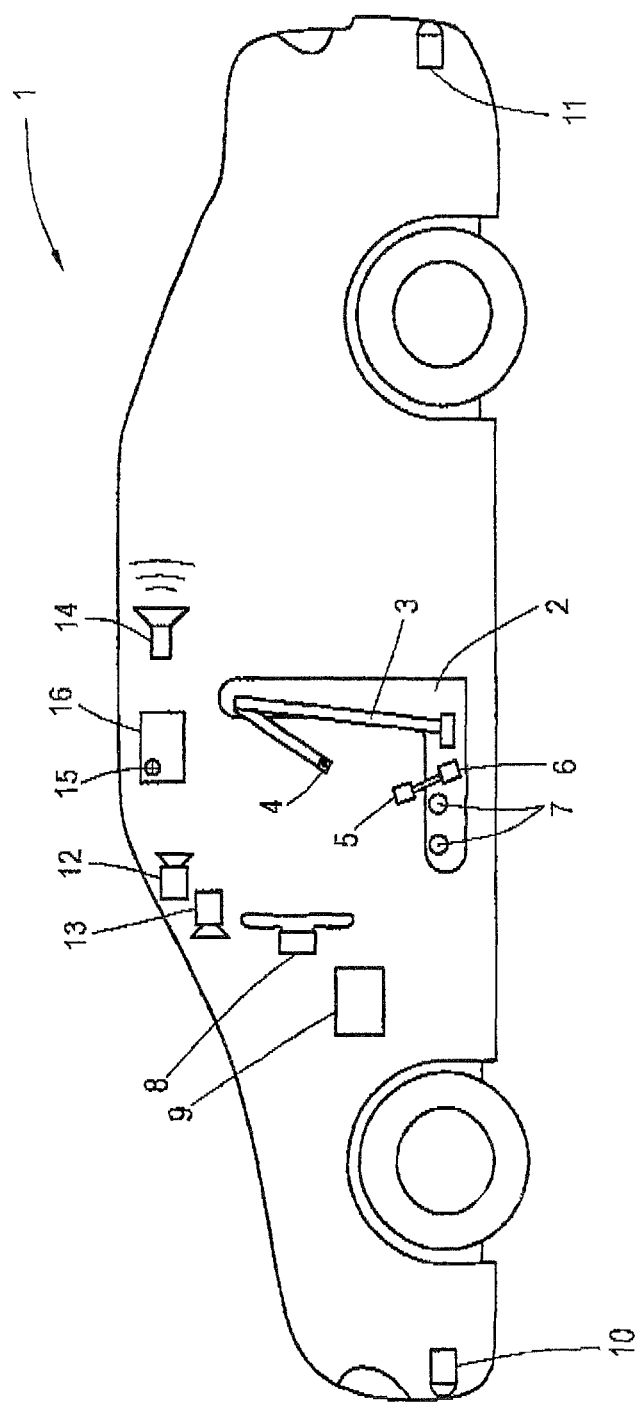
FIG. 1 is a schematic illustration of a motor vehicle having incorporated therein various active and passive safety devices in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing and in particular to FIG. 1, there is shown a schematic illustration of a motor vehicle, generally designated by reference numeral 1 and having incorporated therein various active and passive safety devices in accordance with the present invention. The motor vehicle 1 includes a driver seat 2 which is associated to a safety belt 3 having a buckle latch 4 and a buckle 5 that is provided with a belt retractor 6 as further safety device. Various sensors 7 are integrated in the seat 2 to detect a seat occupation, i.e. to detect whether a person is seated. This information may be necessary to activate an airbag 8 and deploy it when needed. While only one airbag 8 is shown here, it is, of course, to be understood that the motor vehicle 1 can have a plurality of airbags installed at various locations in the vehicle 1.

By way of example, the motor vehicle 1 is further provided with a driver assist system 9 having surround sensors 10, 11, e.g. radar and ultrasonic sensors, and configured as collision monitoring system or lane keep assistant for example. Of course, other driver assist systems may additionally be installed in the motor vehicle 1 if need be.

The motor vehicle 1 is further equipped with an interior camera 12 to monitor the driver so as to detect whether the driver becomes drowsy or fatigued and if need be to alert the driver. In addition, a camera 13 is provided to monitor the surroundings in front of the motor vehicle 1 and to output information about the surroundings that can also be used for operating one or more driver assists systems.

The motor vehicle 1 according to the invention is thus able to communicate to the driver information which can be of acoustic and/or optical nature when a safety device is activated through actuation or activated automatically.

For example, unwinding of the safety belt 3 from a spool 17 can be detected, using an appropriate sensor 18. As shown in FIG. 2, as an occupant pulls the seat belt 3 and unwinds it, the sensor 18 detects this unwinding process and sends a signal to a control unit 19 which, in turn triggers a signal to the driver that accompanies this activation of the safety belt 3. The signal may be an audible signal, produced by a loudspeaker 14 for example, or may also be an optical signal appearing in a display 16 for example. When the buckle latch 4 is ultimately inserted in the buckle 5 to close the safety belt 3, a sensor 20 in the buckle 5 detects this situation and transmits a signal to the control unit 19 which, in turn causes the loudspeaker 14 to output an audible signal which is different than the audible signal during the unwinding process and indicates the conclusion of this activation process. This is shown in FIG. 3.

Automatic activation of e.g. the airbag 8 can also be ascertained via the control unit 19. When the airbag 8 is activated, the control unit 19 causes for example illumination of a symbol 15 in the display 16 to visualize this for the driver at least indirectly as well as continuously during following travel, optionally on a reduced format.

This symbol 15 may also indicate simultaneous activation of a driver assist system 9 that may automatically be activated and includes the sensors 10, 11 which are activated even when the actual driver assist system 9 remains inactive. The symbol 15 thus represents virtually a superordinate activation symbol for different sensors or safety devices.

When occupants are seated in the motor vehicle 1 and, for example, are in the process of buckling up, this process can be accompanied by an acoustic signal, as described above. When then starting ignition, the other sensors or safety devices are activated, such as airbag 8, possible driver assist system 9, sensors 10, 11, cameras 12, 13. The respective activation state and state of operation is detected by respective controllers. As soon as the respective system and safety device is activated and operational, the information is transmitted to the central control unit and is displayed in the form of symbol 15 on the display 16. Of course, different symbols may be assigned to the individual safety devices and separately displayed.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A motor vehicle, comprising
    a safety device changeable between an idle position and an operative position;
    a first sensor detecting a first time point at which the safety device departs from the idle position;
    a second sensor detecting a second time point at which the safety device assumes the operative position; and
    an indicator operatively connected with the first and second sensors, said indicator being outputting a first acoustic or optical signal during an entire time from the first time point to the second time point and outputting a second acoustic or optical signal, which is different than the first acoustic or optical signal, when the safety device has assumed the operative position.

2. The motor vehicle of claim 1, wherein the first and second signals are acoustic signals.

3. The motor vehicle of claim 1, wherein the indicator is a display to optically visualize the first and second signals as first and second images.

4. The motor vehicle of claim 1, wherein the safety device is constructed to be triggered automatically or actuated by a person inside the motor vehicle.

5. The motor vehicle of claim 1, wherein the safety device is constructed in the form of a safety belt having a buckle and movable between the idle position in which the safety belt is retracted and the operative position in which the safety belt is locked, said first signal being triggered when the buckle is pulled away from the idle position, and the second signal being triggered, when the buckle of the safety belt is engaged.

6. The motor vehicle of claim 2, wherein the indicator is an audio system installed in the motor vehicle to generate the acoustic signal.

7. The motor vehicle of claim 2, wherein the indicator is an audio system installed in the motor vehicle to generate the second acoustic signal.

8. The motor vehicle of claim 1, wherein the indicator is a display which provides an indication when the safety device automatically reaches the operative position.

9. The motor vehicle of claim 8, wherein the display indicates the operative position by a symbol.

10. The motor vehicle of claim 8, wherein the indication on the display is displayed during operation of the vehicle.

11. The motor vehicle of claim 10, wherein the indication is displayed in modified form.

12. The motor vehicle of claim 11, wherein the indication is displayed on a scaled down form.

13. The motor vehicle of claim 5, further comprising a control unit, said indicator being operatively connected to the first and second sensors via the control unit, wherein the first sensor is placed in vicinity of a spool of the safety belt, and the second sensor is placed in vicinity of the buckle and wherein the control unit controls the indicator to output the first and second signals.

14. A motor vehicle, comprising:
    a safety belt having a buckle and movable between an idle position in which the safety belt is retracted and an operative position in which the safety belt is locked,
    a first sensor detecting a first time point at which the safety device departs from the idle position;
    a second sensor detecting a second time point at which the safety device assumes the operative position; and
    an indicator operatively connected with the first and second sensors and constructed to respond to a movement of the safety belt between the idle position and the operative position in at least one of two ways, a first way in which the indicator outputs a first acoustic signal during an entire time from the first time point to the second time point the second time point, and a second acoustic signal, which differs from the first acoustic signal, is triggered when the safety device has assumed the operative position, a second way in which the indicator displays a first image in a display during the entire time from the first time point to the second time point, and displays a second image different from the first image in the display when the safety device has assumed the operative position.

15. A motor vehicle, comprising:
    a safety device changeable between an idle position and an operative position;
    a first sensor detecting a first time point at which the safety device departs from the idle position;
    a second sensor detecting a second time point at which the safety device assumes the operative position; and
    an indicator operatively connected with the first and second sensors and constructed to respond to a movement of the safety device between the idle position and the operative position
    in one of two ways, a first way in which the indicator displays a first image in a display during an entire time from the first time point to the second time point and a different second image when the safety device has assumed the operative position, and a second way in which the indicator outputs a first acoustic signal and displays a first image during the entire time from the first time point to the second time point and outputs a different second acoustic signal and displays a different second image when the safety device has assumed the operative position.

* * * * *